March 1, 1932.  H. W. HOSKINS ET AL  1,847,945
FILM ATTACHING MEANS FOR MOTION PICTURE REELS
Filed March 12, 1929
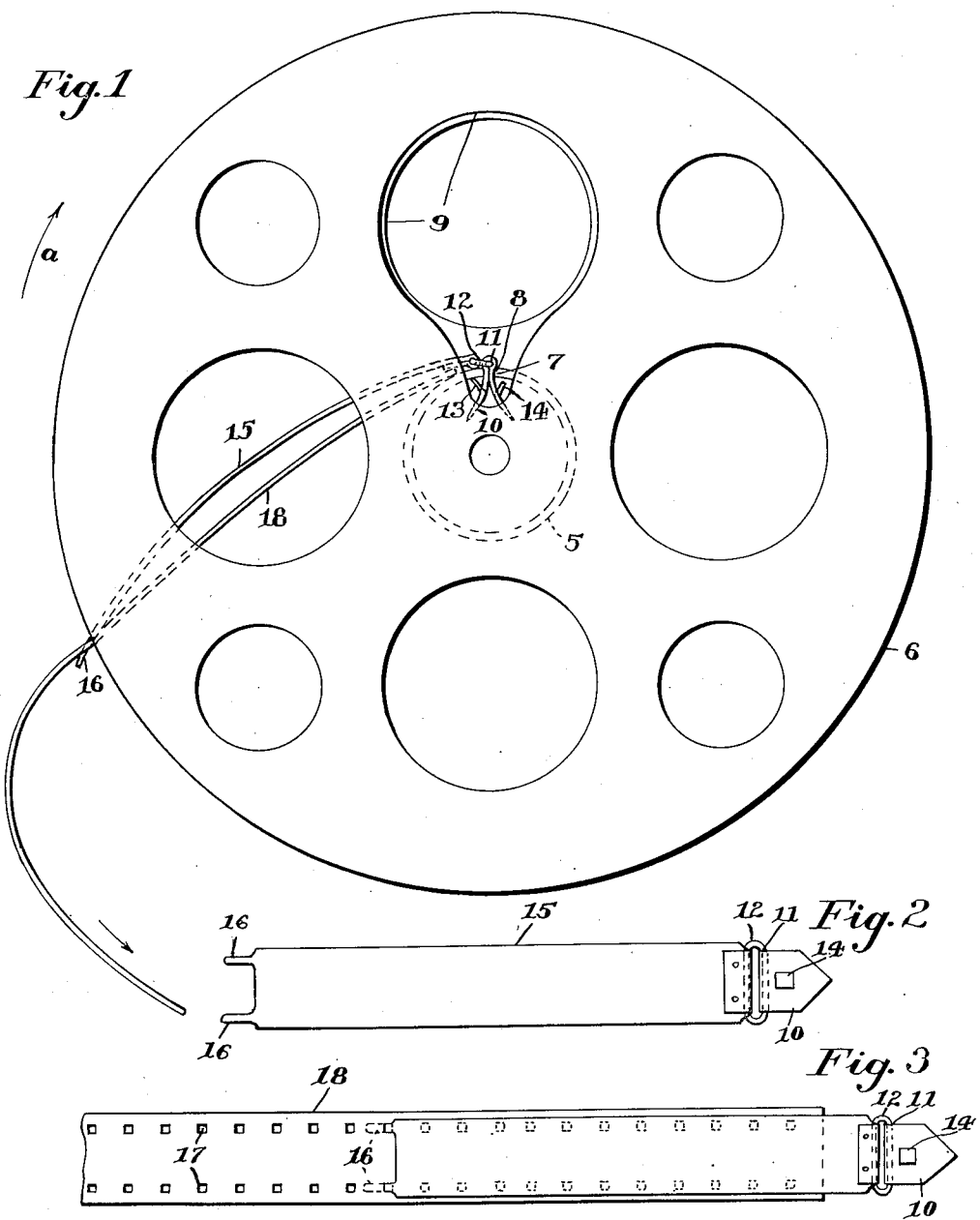
INVENTORS
Herbert W. Hoskins
and
BY  Carl A. Hasslacher
Chamberlain & Newman
ATTORNEYS.

Patented Mar. 1, 1932

1,847,945

UNITED STATES PATENT OFFICE

HERBERT W. HOSKINS AND CARL A. HASSLACHER, OF BRIDGEPORT, CONNECTICUT

FILM ATTACHING MEANS FOR MOTION PICTURE REELS

Application filed March 12, 1929. Serial No. 346,373.

This invention generally relates to motion picture film reels and more particularly to film attaching means therefor, whereby the end portion of a film may be quickly attached or threaded, so to speak, in a way to insure the winding of the film upon the reel and in a manner to permit of its quick releasement when the film is again run off.

The object of the invention is to provide a film attaching means which can be readily secured to any of several commercial types of reels, for the attachment of films, and so as to permit the films to be wound upon the reels in either direction, that is in clockwise or counterclockwise direction, and so as to allow the film to be quickly released at the proper instant when the film is run off without possible damage to the latter.

Further to provide a film attaching means which can be inexpensively manufactured of a resilient and flexible sheet material, as for instance brass, and in a way to allow of its quick attachment to any of the several slotted hub types of reels now upon the market and particularly to proportion and design this attaching means so that when it is attached to a reel its outer end portion, to which the film is mainly attached, will be closely adjacent to the rim of the reel and thus free to be manipulated by the operator for the engagement of the film and in a manner to materially expedite and simplify the attachment of the film.

Other objects will appear and be better understood from an embodiment of the invention of which the following is a specification, reference being had to the accompanying drawings forming a part hereof and in which:

Fig. 1 shows a side elevation of a commercial type of sheet metal film reel having our film attaching means secured thereto and a film attached to the attaching member;

Fig. 2 is a detached plan view of the film attaching member disconnected from the reel; and Fig. 3 is a similar view showing the relative position of the end portion of a strip of film attached to the attaching member, for instance, as would be seen from the top of Fig. 1, if looking down into the reel.

Referring in detail to the characters of reference marked upon the drawings shown in Fig. 1, 5 represents the hub of a commercial type of sheet metal reel 6, which hub is formed of a rolled strip of metal having its end portions 7 disposed in opposed and spaced relation, forming a slot 8 which has heretofore been employed to receive the end of a film, or a means to which the film is fastened. 9—9 represent the two side flanges of the reel or spool and which like the hub portion are made of sheet metal and secured to the ends of the hub in a way to form a relatively large annular pocket in which the film is wound.

The invention is especially adapted for quick attachment to a slotted form of hub structure of this or similar types. It includes an attaching anchor member which is in part positioned and secured in the slot, and comprises a flat, resilient, flexible strip which is hingedly connected to said anchor member so that the strip may be readily wound in either direction upon the hub. This anchor member which we have designated as 10 is formed of a short length of sheet metal having pointed ends and folded over midway of its length to form an eye 11 in which a metal link 12 is hingedly supported. The two projected leg portions of the anchor are of spring metal and normally tend to spread apart and are each provided with an integrally stamped-out lug 13 and 14, the former of which is positioned closer to the transverse eye portion than the other.

These lugs serve to engage the inner wall of the hub adjacent to the slot if the pointed ends of the anchor have been shoved in sufficiently far, thus forming a lock against any accidental displacement of the anchor. As before stated, one of the lugs is positioned closer to the eye than the other which better serves to adapt them for engagement with hubs of different thicknesses, as for instance the closer lug 13 would serve to engage a thinner wall hub, whereas the lug 14 positioned farther away would engage a thicker wall hub such as would probably not be engageable by the other lug. This double means of fastening obviously serves to form a closer engagement of the anchor with different type of hubs and insures the positioning of the eye and the hinged connection close upon the surface of the hub.

15 represents the resilient flexible strip to which the film is attached in the threading of the film upon a reel. The inner end portion of this strip is folded over and around the elongated link 12, previously referred to as being hingedly connected to the anchor piece. This folded over end may be secured by rivets or other suitable means and like the connected anchor member forms a hinged connection with the link so as to allow the latter to fold down flat upon the periphery of the hub when the film and strip are wound thereon.

The outer end of the film attaching strip is provided with a pair of straight spaced apart projections 16—16, one adjacent to each edge and at a proper distance apart, one from the other, each to engage a hole of each series of aligned holes 17 arranged along the two edge portions of the film 18, so that in the attachment of the film to the strip the two said projections may be readily positioned in a pair of holes, one in each series along the edges of the film and at suitable distance from the end of the film as is indicated in Figs. 1 and 3. This as will be seen disposes the end of the film 18 closely adjacent to the hub of the reel and between the hub and the inner face of the film attaching strip in such a manner that when the film is attached as shown in Fig. 1, and the reel is rotated in the direction indicated by arrow $a$, producing a slight tension or pull in the outer portion of the film, the strip is flexed, and due to the resiliency of the strip and the film, the leverage so produced by the projections of the strip inserted in the holes in the film, frictionally secures the film to the film attaching strip so that together they are wound upon the hub in a manner to further insure the secure attachment of the film to the reel.

It will also be apparent that in the unwinding of the film the inner end portion will readily detach itself from the hub and attaching member, since the projections on the end of the strip are straight and have no shoulders or hook portions to hold and tear the film.

Having thus described our invention, what we claim and desire to secure by Letters Patent is:

1. A resilient and flexible film attaching member which may be hingedly attached to a film reel and having a pair of straight projections extended from its outer free end and spaced apart to engage the openings adjacent the edges of the film.

2. A resilient and flexible film attaching member terminating at one end in a pair of spaced straight projections for engagement with holes adjacent the edges of the film, means adapted to engage the hub of a motion picture film, and said film attaching member hingedly connected at its other end to said means.

3. The combination with a film reel, of a resilient flexible film attaching member hingedly connected to the reel, adapted to embrace the hub of said reel and having a pair of straight projections extended from its outer free end and spaced apart to engage the openings adjacent the edges of the film.

4. The combination with a film reel, of an anchor adapted to engage the hub of the reel, a film attaching member having its inner end hingedly connected to said anchor and having integral projections extended from its outer end for engagement with holes of the film, said projections engageable respectively in the holes in the sides of the film.

5. The combination with a picture reel and a resilient flexible attaching strip hingedly connected thereto, adapted to be wound thereabout, having straight projections extended from its free end portion, of a film having a series of holes along each edge portion to be engaged by the respective projections, and having one end positioned between the hub and the hinged end portion of the strip.

6. The combination with a motion picture reel of a resilient and flexible film attaching member hingedly connected thereto, adapted to be wound thereabout in either direction, and having straight projections extended from its free end to engage holes in the film, said projections engageable respectively in the holes in the sides of the film.

7. The combination of a motion picture reel including a slotted hub, an anchor to be inserted in said slot and having means to engage said hub to hold the anchor therein, and a resilient and flexible film attaching member, one end hingedly connected to said anchor and provided with straight extended projections extended from its other end designed to engage respectively in the holes in the sides of the film to be attached thereto.

8. The combination with a motion picture reel and a resilient and flexible attaching strip, hingedly attached thereto, having straight projections extended from its outer end portion, of a film positioned against the inner side of the strip and having its end portion disposed between the hub of the reel and the strip, said film having a series of holes along each edge portion to detachably receive the respective projections of the strip, the portion of the film extending beyond the projections being disposed from the outer side of the strip.

9. The combination with a motion picture reel and a resilient flexible attaching strip having straight projections extended from its outer end portion and adapted to be hingedly connected thereto, of a film positioned against one side of the strip and having its end portion engaged by the hub of said reel, said film also having a series of holes along each edge portion to detachably receive the respective projections of the strip.

10. The combination with a motion picture reel and a resilient flexible attaching strip hingedly connected thereto, having straight projections extended from its free end portion, of a length of film positioned against the inner side of the strip and having its inner end positioned between the hub and the strip, said film also having a series of holes along each edge portion to detachably receive the respective projections of the strip, the portion of the film extended beyond the projections being disposed from the outer side of the projections.

11. A resilient and flexible film attaching member terminating at one end in a tongue-like projection for engagement in holes in a film, means adapted to engage the hub of a motion picture reel, and said film attaching means hingedly connected to said means.

Signed at Bridgeport, in the county of Fairfield and State of Connecticut this 9th day of March, A. D. 1929.

HERBERT W. HOSKINS.
CARL A. HASSLACHER.